July 19, 1966
G. ALFIERI ET AL
3,261,645
METHOD AND DEVICE FOR THE AUTOMATIC MODULATED EMERGENCY BRAKING
OF TOWED VEHICLES PROVIDED WITH PNEUMATIC BRAKING SYSTEM
Filed Feb. 17, 1964
2 Sheets-Sheet 1
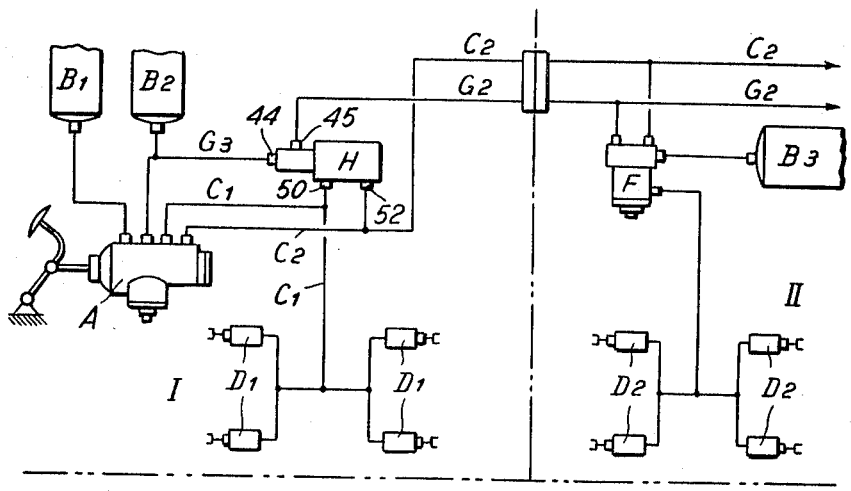
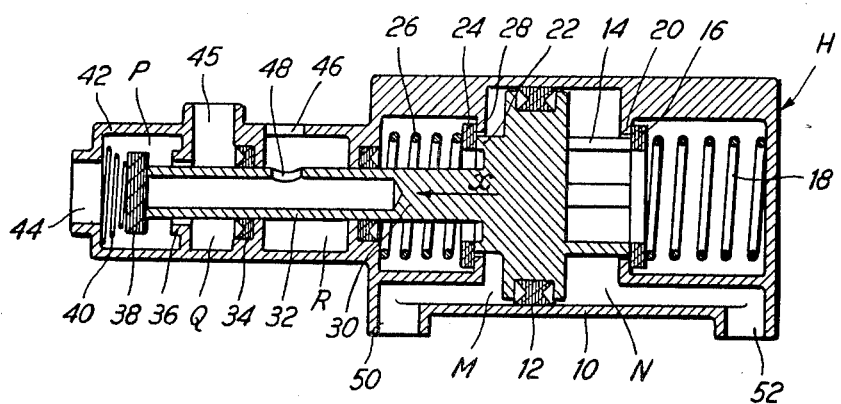
INVENTORS
Giuseppe Alfieri
Roberto Moriondo
By Stevens, Davis, Miller & Mosher
ATTORNEYS

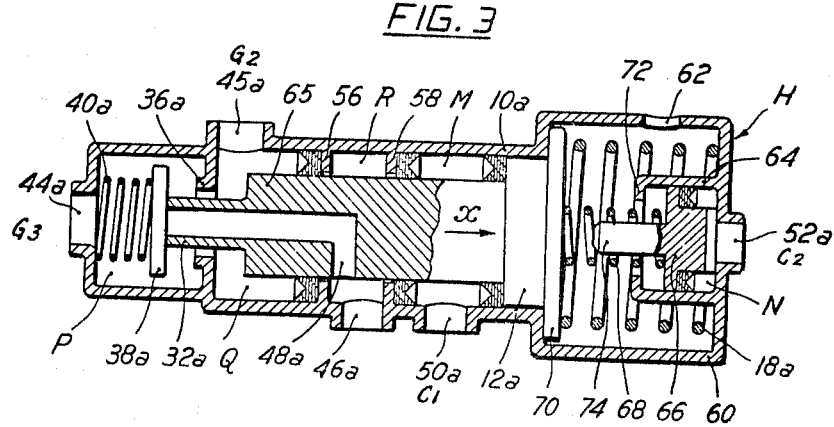
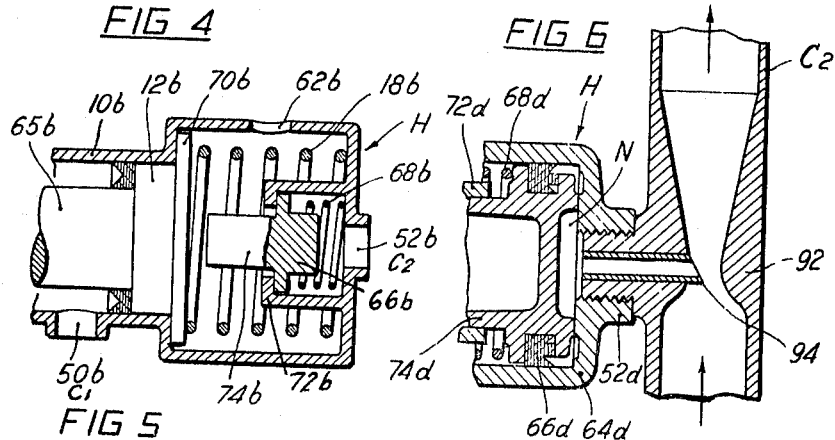
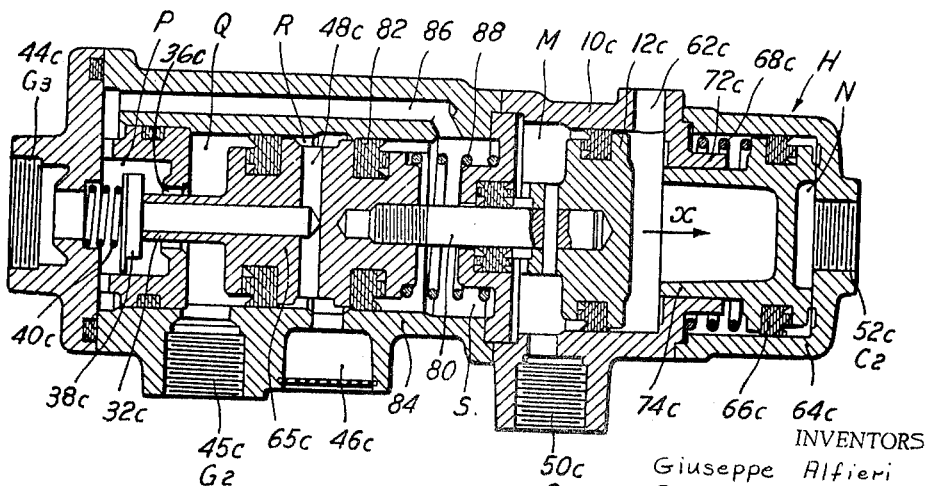

United States Patent Office 3,261,645
Patented July 19, 1966

3,261,645
METHOD AND DEVICE FOR THE AUTOMATIC MODULATED EMERGENCY BRAKING OF TOWED VEHICLES PROVIDED WITH PNEUMATIC BRAKING SYSTEM
Giuseppe Alfieri and Roberto Moriondo, Milan, Italy, assignors to Fabbrica Italiana Magneti Marelli S.p.A., Milan, Italy, a corporation of Italy
Filed Feb. 17, 1964, Ser. No. 345,474
Claims priority, application Italy, Feb. 27, 1963, 32,340; June 1, 1963, 35,696
19 Claims. (Cl. 303—7)

This invention relates to a method and the respective device for the automatic modulated emergency braking of towed vehicles provided with a pneumatic braking system.

In such a system, a distributor controls the supply of the braking members by means of two lines: one for the service braking, and the other for the automatic braking in the case of emergency.

In the composite vehicles (comprising a tractor and one or more trailers), provided with these pneumatic braking systems, it should be possible, in the case of breakdowns or breakage in the service braking line of the trailer, to effect a service emergency braking according to the desired requirements. In general, this emergency braking must have the possibility of being released and re-applied successively with a different pressure so that the kinetic energy of the vehicle, and especially that of the trailer, is dissipated and removed instead of discharged on the tractor in order to avoid damages and accidents.

An object of this invention is to enable the emergency service braking to be automatically effective at any time and also in the case of breakdowns or a breakage in the trailer service braking line, no previous handling being necessary. Thus, in a case of emergency, and when the distributor of the braking system is operative, the trailer brakes are always actuated with the same sequence of operation as the brakes of the tractor, the actuation of said trailer brakes also being effected in a known way in advance with respect to those of the tractor.

The method according to this invention, which is applicable to a pneumatic braking system comprising an automatic braking line and a service braking line, a distributor on the tractor and an automatic relay valve on the trailer, is characterized by using the unbalance which takes place, between the pressures in the service braking lines of the tractor and the trailer in emergency conditions to control the modulated operation of the valve members shiftable between two positions which control the communication of the automatic braking line of the trailer either with the discharge or with the compressed air source. Therefore, when such emergency conditions occur, the modulated operation of the distributor actuates, through an automatic relay valve, the trailer brakes substantially in synchronized relationship with those of the tractor.

The device which carries out the method described above and which can be fitted in the service braking line and in the automatic braking line comprises: first means, responsive to the pressure of the trailer service braking line; second means, responsive to the pressure in the tractor service braking line in which the movable portion of said second means drivingly cooperates with that of the first means, so that the respective pressures on the movable portions act in opposite directions; and valve means, shiftable between two positions and operated by said second means for controlling the communication of the automatic braking line either with the discharge or with the pressure source.

According to an advantageous embodiment of this invention, the device comprises two piston-cylinder assemblies, one of the two chambers of each assembly being connected with the service braking line of the tractor, and the other with the service braking line of the trailer, whilst the springing means act on the movable portions of said assemblies, said springing means being arranged so that the action thereof is in contrast with that of the pressure.

The pressure changes, which can occur in the pneumatic braking systems, and particularly the various operations made by the compressed air acting on the movable portion of the shiftable valve members, result in various drawbacks in that the action of the compressed air is sometimes in contrast with the action of the springing means, the force of which is generally constant. These drawbacks are avoided, in that the pressure responsive means of the service braking line of the tractor (and accordingly the movable portion of said shiftable valve members), have fluid pressure-operated members which are apt to counterbalance the pressure of the compressed air on said movable portion of the shiftable valve members.

In order to avoid the adhesion (or sticking) of the movable parts of the piston-cylinder assemblies now considered and, particularly, of the movable part of the assembly responsive to the pressure in the service braking line of the tractor, said movable part accomplishes a limited displacement during each braking.

This result can be obtained in a number of ways, for example, by suitably adjusting the force of the springing means acting on the movable portion of said assembly.

As it will be understood, the movable portions of the two piston-cylinder assemblies, while cooperating with each other, can either be mechanically independent from each other in a given direction of movement, or mechanically connected with each other.

The invention will now be described in the following description with reference to the accompanying drawings which illustrate, by way of example, some embodiments of a device which carries out the method of this invention.

FIGURE 1 is a diagrammatic plan view of a pneumatic system for braking a tractor-trailer combination provided with the device of this invention in order to practice the method of this invention, FIGURE 2 is a diagrammatic longitudinal cross-sectional view of a first embodiment of said device, FIGURE 3 is a similar representation of another embodiment of said device, FIGURE 4 is a partial sectional view of another embodiment of the device of this invention, FIGURE 5 is an axial cross-sectional view of a further embodiment of the device according to this invention, and FIGURE 6 is a cross-sectional view of a modification of the device illustrated in FIGURE 5.

With reference to the diagram of FIGURE 1, the two pneumatic sections of the tractor and the trailer are designated by I and II respectively, the former carrying, in a known way, a distributor A which is connected with two reservoirs $B_1$ and $B_2$, which in turn are supplied by a compressor, not shown. These reservoirs feed, through said distributor, a tractor braking element $D_1$ (through the service braking line $C_1$) and a trailer braking element $D_2$ (through a line $C_2$ and an automatic relay valve F).

Reservoir $B_2$, through an automatic braking line $G_2$ and automatic relay valve F of the trailer, also supplies, as hereinafter set forth, a complementary reservoir $B_3$ installed on said vehicle in a known way.

The device H, according to this invention, constitutes, in the case illustrated, an element of braking section I and said device is fitted in the system as hereinafter set forth.

With reference to FIGURE 2, device H comprises a casing 10 defining a cylinder, in which a differential piston 12 slides in an air-tight manner and which defines two chambers M and N, the effective surface of the latter being greater than the former.

Piston 12, at the rear end thereof, has a crown-shaped projection 14 which engages, through a washer 16, a helical spring 18 which holds said washer engaged with either the edge of said crown-shaped projection 14 or with a flange 20, integrally formed with cylinder 10.

Likewise, the front face of piston 12 has an annular projection 22 cooperating with a washer 24, on which a spring 26 acts, said spring holding said washer 24 engaged with either the projection 22 or with a flange 28 integral with cylinder 10.

It is apparent that springs 18 and 26, owing to their arrangement, act upon piston 12 in opposite directions and firmly maintain it in the position illustrated in FIGURE 2, and when said piston is moved in either direction, this displacement is resisted by one of said two springs.

A hollow pushrod 32, which passes through an air-tight wall 34 and a valve seat 36 to engage, when the piston is in the inactive position illustrated in FIGURE 2, a flow control valve 38 biased by a spring 40 which is carried by stem 30 of piston 12. Wall 34 and seat 36 are carried by a casing 42, the axis of which coincides with the axis of cylinder 10, thus defining in combination with these portions the chambers P, Q and R. The first of said chambers has a connection fitting 44 for a line $G_3$, which is connected with reservoir $B_2$. Chamber Q is connected, through a connection fitting 45, with a line $G_2$ for the automatic braking of the trailer. Finally, chamber R is connected with the atmosphere through an aperture 46. A radial hole 48 in pushrod 32 leads to this chamber to put into communication said chamber with the axial bore in said pushrod.

Likewise, chambers M and N are connected to connection fittings 50 and 52, respectively, with line $C_1$ (connected with the braking elements $D_1$ of the tractor) for the service braking of the tractor and with line $C_2$ for the service braking of the trailer.

The operation of the device and the system after the aforementioned should be quite clear. By connecting fitting 44 with reservoir $B_2$, the air of said reservoir is permitted to pass into chamber P, and from this chamber, through seat 36 of open valve 38, it passes into chamber Q to supply, through fitting 45, automatic braking line $G_2$ and automatic relay valve F, reservoir $B_3$ installed on the trailer.

In the normal conditions, when acting on the foot pedal of distributor A for braking the composite vehicle, air under modulated pressure is supplied both to the braking elements $D_1$ of the tractor and to line $G_2$ for the service braking of the trailer, to actuate through automatic relay valve F the braking elements $D_2$ of the trailer, thereby effecting the normal braking of the composite vehicle. The air of distributor A enters both chambers M and N of the differential piston-cylinder assembly with pressures which are substantially equal. Due to the differential effective areas presented by piston 12, the latter is displaced in the direction of arrow X against the action of spring 26 and this displacement is limited by flange 28 which acts as a stopping means.

According to this invention, this displacement, even if a small amount, is provided in order to inhibit the eventual adhesion or sticking of the sealing gaskets of the pushrod 32 and piston 12, thereby assuring in emergency cases that piston 12 will become displaced by spring 26. This displacement—as already pointed out—is of a limited amount, and does not cause any change whatsoever in the pneumatic conditions of the device illustrated in FIGURE 2, while always maintaining valve 8 away from its seat 36.

In the event that the service braking line $C_2$ should break, and if pressure drops should occur, whatever the cause may be, the distributor A when actuated supplies, in a known way, air not only to braking system $D_1$ of the tractor, but also to chamber M. On the contrary, sufficient pressure to balance the actions of the pressure in chamber M and of spring 26 cannot be built up in chamber N, since line $C_2$ for the trailer service braking cannot be pressurized for the aforementioned reasons.

In these conditions, piston 12 is moved in the direction opposite to arrow X and abuts flange 20, and, accordingly, pushrod 32, while retracting, permits valve 38 to abut the respective seat 36 and disengages its end from said valve 38. Thus a communication is established, through said pushrod and bore 48, between chambers Q and R so that the automatic braking line $G_2$ of the trailer is put into communication with the atmosphere in order to thereby accomplish the emergency braking of the trailer, in a known way, simultaneously with the tractor braking. In this way the inertia of the trailer is prevented from acting on the tractor.

Obviously, and as can be readily understood, springs 18 and 26 are conveniently pre-loaded depneding upon the pressures and characteristics of the braking system.

The other embodiment illustrated in FIGURE 3 shows the portions similar to those of the embodiment of FIGURE 2 designated by like reference numerals followed by the letter "a."

The device of this embodiment provides two piston-cylinder assemblies responsive to the pressure in service braking line $C_1$ of the tractor and in the service braking line $C_2$ of the trailer.

Piston 12a air-tightly slides within cylinder 10a, said piston 12a being permanently urged at one of its two ends by a spring 18a, the force of which is substantially equal and opposite to that of the pressure acting on a piston 65 which will be described hereinafter. Cylinder 10a, towards its intermediate inner portion is provided with flanges 56 and 58, which define in said cylinder two annular chambers M and R which are connected, respectively, with line $C_1$ through a fitting 50a and with discharge through the respective fitting 46a. Chamber R is also connected, through a radial duct 48a, with hollow pushrod 32a.

A third chamber Q is provided in cylinder 10a and it is connected, through a fitting 45a, with automatic braking line $G_2$ of the trailer. A piston 65 slides in this chamber and comprises a stud 65 integral with piston 12a and pushrod 32a. Cylinder 10a, at the other end thereof, ends with a box-like body 60 in which spring 18a is placed and which communicates with the atmosphere through an aperture 62.

The end wall of body or casing 60 has formed therein a cylinder 64 co-axial with cylinder 10 and in the interior of which a piston 66, urged by a spring 68, slides. The other end of this spring is retained by a flange 70, provided at the right end of piston 12a, which by cooperating with an abutment in the interior of body 60 forms a stopping element for said piston subjected to the action of spring 18a. Cylinder 64 at one of the ends thereof has an inwardly facing flange 72 which forms a stopping element for piston 66, whereas at the other end said cylinder is formed with a fitting 52a to which service braking line $C_2$ of the trailer is connected. Piston 66 is provided with a stud 74 which is connected to end 70 of piston 12a in order to form a movable stopping element for said piston, as will be hereinafter disclosed.

In the other embodiment of FIGURE 4, piston 66b is pressed against flange 72b by the respective spring 68b which in this embodiment performs an action opposite to the action of spring 68 of FIGURE 3 so as to constantly keep piston 66b at its end position.

The operation of the device illustrated in FIGURES 3 and 4 is similar to that of the preceding device. When the braking system is in operation, air form reservoir $B_2$ is fed, through line $G_3$, fitting 44a, chambers P and Q and fitting 45a, to automatic braking line $G_2$. Air under pressure in chamber Q acts on piston 65 and accordingly also on piston 12a with a force acting in the direction of arrow X. This action is resisted by the action exerted on piston 12a by spring 18a, and in the case of FIGURE 3, also by the force exerted by spring 68.

The stroke of piston 12a is limited so that valve 38a is always disengaged from respective seat 36a.

When distributor A is actuated, compressed air is simultaneously supplied into chambers M and N of device H; the air which enters the former of said chambers acts on the annular surface of piston 12a and further displaces the latter in the direction of arrow X so as to engage its end 70 against stud 74 of piston 66. It should be appreciated that this piston under the action of compressed air in chamber N and in service braking $C_2$ of the trailer is displaced until it stops against a crown or flange 72 in order to constitute a stopping element for piston 12a. Thus, piston 12a during the operation of distributor A always accomplishes short displacements which, as already pointed out, avoids the possibility of said piston's adhering and sticking to the cylinder 10a. Since the surface of piston 66 is equal or less than the annular surface of piston 12a, this piston is displaced under the pressure in chamber M until it is stopped by stud 74. Also in this case, the full displacement of said piston and, therefore, the displacement of pushrod 32a is such as to maintain the passage between chambers P and Q always open.

Assuming that service braking line $C_2$ of the trailer will become broken or damaged, the air pressure in chamber N, when distributor A is operated, is less than that in chamber M whereby piston 66 either is actuated or is not actuated by a limited pressure such that piston 12a under the action of the pressure in chamber M pushes piston 66 in the direction of arrow X toward fitting 52a. In this case, the displacement of piston 12a in the direction of arrow X is greater than the preceding one (the system being in a normal condition) and such as to permit valve 38a to rest on seat 36a. Therefore, on one hand, the communication between chambers P and Q is shut off and, on the other hand, said chamber Q becomes connected, through pushrod 32a, with discharge port 46a. Consequently, the automatic relay valve F of the trailer, responsive to the drop of pressure in automatic braking line $C_2$, supplies the braking members $D_2$ of the trailer with air from reservoir $B_3$. The next controls made by the driver on the distributor $A_1$, are repeated by device H and, accordingly, also by the automatic relay valve F so that the braking members $D_1$ of the tractor and the braking members $D_2$ of the trailer are actuated in the same sequence.

Considering now the embodiment of FIGURE 5, a device H, similar to that of FIGURE 3, is illustrated; therefore, the portions of such device which are similar or equivalent with respect to the other embodiments are designated by like reference numerals followed by the letter c.

Device H of this further embodiment is constructed so as not to be sensitive to the pressure changes which could eventually occur in the pneumatic system, particularly in chamber Q to which automatic braking line $G_2$ is connected since the action of spring 18a of FIGURE 3 is substantially constant.

A stem 80 is integral with piston 12c, responsive to the pressure existing in chamber M which is connected to service braking line $C_1$ of the tractor, to which stem is connected a double piston formed by piston 65c and by a further piston 82 opposite the first.

These two pistons have diameters substantially equal and air-tightly slide in a single cylinder 84 which is coaxial with and can be conveniently connected to cylinder 10c of piston 12c.

Pistons 65c and 82 define three chambers Q, R and S in said cylinder 84.

Chamber Q is connected with automatic braking line $G_2$; chamber R is connected with the discharge opening 46c and, through radial bores 48c, also with pushrod 32c. Finally, chamber S is connected, through a duct 86 in the wall of cylinder 84, with chamber P connected to reservoir $B_2$ of air under pressure.

Since stem 80 has a cross-section the surface of which, even though quite small, restricts the effective surface of piston 65c, a spring 88 by means of its action substantially compensates for the eventually pressure differences which could take place on said pistons 65c and 82.

In this embodiment, cylinder 64c is provided as an element removably applicable to cylinder 10c which has, at one of the ends thereof, a crown or projection 72c which acts as a guide and stopping means for piston 66c which is pressed towards the bottom of said cylinder 64c by means of a spring 68c.

The operation of the device now described is similar to that shown in FIGURE 3. Namely, each time that distributor A of FIGURE 1 is actuated, compressed air is supplied into chamber M thereby causing piston 12c to be displaced in the direction of arrow X.

The pressure acting on piston 65c which slides in chamber Q is substantially balanced by the equal pressure exerted by the air from chamber P and acting on piston 82; therefore, said piston 12c is biased only by the pressure which builds up in chamber M.

When the stopping means formed by piston 66c (on which acts the pressure in chamber N dependent on the pressure in the service braking line of the trailer) is moved away from its normal position (and this, as already stated, as a consequence of leakage or breakage in the service braking line $C_2$ of the trailer), piston 12c and pushrod 32c can effect the maximum displacement and accordingly, through said pushrod, chamber R is connected with the exhaust 46c to actuate, as already pointed out, the braking members $D_2$ of the trailer in synchronization with the actuation of the corresponding brake members $D_1$ of the tractor.

Turning now to FIGURE 6, it shows an improvement to the device of FIGURE 5 to improve the performance of said device, especially to increase the sensitivity of piston 66d to the pressure of air which passes through service braking line $C_2$ of the trailer.

According to this figure, in line $C_2$ there is provided a restriction formed by a diaphragm 92 which, in the case illustrated, is shaped as a Venturi tube placed adjacent to fitting 52d.

Diaphragm 92 has, at its narrow neck, a nozzle 94 conveniently shaped to connect said narrow neck with chamber N.

When distributor A is operated, as hereinbefore set forth, an air flow is supplied into line $C_2$, which flow changes in speed at the restriction of the diaphragm 92 so as to suitably actuate piston 66d.

Modifications and variations can be made to the device described and illustrated herein: for example, this device can be embodied in any unit of the pneumatic system, preferably in the distributor A.

Moreover, spring 26 may have some stopping means 24–28 missing, to thereby continuously exert its action on piston 12. The controlled and limited stroke of said piston 12 can also be obtained by using springs 18 and 26 of different forces to thereby avoid the adhesion of the movable portions to the stationery portions of the device.

In the event of the modification shown in FIGURES 3 and 4, the action of springs 18a and 18b, respectively, on pistons 12a and 12b, respectively, can be performed only for a length of the overall stroke of said pistons, as shown in FIGURE 2.

The displacement of piston 12a, at each braking could be obtained, other than with the direct pressure, also with other means; for example, said piston could move apart for a certain length under the action of two sets of springing means having different strengths.

The surfaces of the pistons subjected to different pressures of compressed air can conveniently vary one from the other also depending upon the purposes which are to be carried out.

Always in the case of FIGURES 3 and 4, the piston-cylinder unit 64–66 could be placed in any other suitable position with respect to the piston-cylinder unit 10–12.

In FIGURE 6, the restricting diaphragm 92 could be interchangeable with others of different flow cross-sections. Moreover, nozzle 94 could be placed upstream or downstream of said diaphragm in order to obtain the desired results, and said nozzle could be applied also to the devices illustrated in FIGURES 2 to 4.

Of course, this invention is also directed to the distributor and the pneumatic braking system which, embodying the device explained hereinbefore, carries out the characteristic process of this invention.

It will be obvious that these and other modifications can be made without departing from the scope of this invention.

We claim:
1. A device for tractor-trailer braking systems having a trailer pneumatic braking system including an automatic braking line, and service braking lines for said tractor and trailer respectively, said device comprising first means and second means responsive to the pressure in said tractor and trailer service braking lines respectively, means for rendering said first and second pressure responsive means cooperative with each other in order that the actions of the respective pressures may be mutually opposite, and valve means normally connecting said automatic braking line to a source of air pressure and being actuated by a loss of pressure on said second pressure responsive means to vent said automatic braking line.

2. A device as claimed in claim 1, in which said first and second pressure responsive means comprise first and second piston-cylinder assemblies, chambers formed in said assemblies by the pistons and the cylinders, means for connecting a chamber of said first piston cylinder assembly with the service braking line of the tractor and a chamber of said second piston cylinder assembly with the service braking line of the trailer, and spring means acting on at least one of the pistons of said piston-cylinder assemblies.

3. A device as claimed in claim 2 including said piston-cylinder assemblies positioned between the service braking lines of said tractor and trailer, the pistons of said assemblies having different effective surfaces, the piston on which the pressure acts for the service braking of the trailer having a surface no less than equal to that of the piston on which the pressure acts for the service braking of the tractor.

4. A device as claimed in claim 1 wherein said first pressure responsive means comprises a portion acting to counteract the pressure exerted by the compressed air on said valve means.

5. A device according to claim 2 wherein said first piston cylinder comprises a third and fourth piston-cylinder assemblies responsive to the pressure for the service braking of the tractor, chambers formed in said fourth assembly by said piston and said cylinder, and means to connect one chamber of said fourth assembly with the automatic braking line.

6. A device as claimed in claim 2 wherein the pistons of the first and second piston-cylinder assemblies are integral with each other and are mounted within a single cylinder.

7. A device as claimed in claim 2 which comprises spring means acting on a piston of said piston-cylinder assembly responsive to the pressure for the service braking of the tractor and stop means which act to limit said piston for a given length of stroke.

8. A device as claimed in claim 7 wherein said springs are helical springs with one end engaging flanges on the cylinder and the other end engaging flanges on said piston.

9. A device as claimed in claim 6 wherein the chambers of the first piston-cylinder assembly are connected, respectively, with the service braking line of the tractor and with the service braking line of the trailer.

10. A device as claimed in claim 6 wherein the piston of the second piston-cylinder assembly which is responsive to pressure for the service braking of the trailer comprises limiting means for restricting the motion of said piston of said second piston-cylinder assembly and said limiting means being responsive to the pressure of the service braking of the tractor.

11. A device as claimed in claim 10, wherein spring means acting on the piston of the second piston-cylinder assembly are retained by the piston of the first piston-cylinder assembly which is responsive to the pressure for the service braking of the tractor.

12. A device as claimed in claim 10 wherein said first piston cylinder assembly further comprises third and fourth piston-cylinder assemblies coaxial with and in alignment with said second piston cylinder assembly, said third piston of the third piston-cylinder assembly which is responsive to the pressure for the service braking of the tractor being integral with a fourth piston of the fourth piston-cylinder assembly which is responsive to the pressure for the automatic braking, self-lapping valve operated by said first piston cylinder assembly for flow control of said automatic braking line.

13. A device as claimed in claim 12 which comprises said fourth piston rigidly connected with said third piston, said third and fourth pistons sliding in a single cylinder and being connected by means of a stem, a chamber defined in said cylinder by a fourth piston assembly and the second piston being connected through a duct with the pressure air source to thereby balance the action exerted by the pressure acting on said fourth piston from the pressure for the automatic braking.

14. A device as claimed in claim 13 which comprises spring means acting on each of said first and second pistons, the action of said springs serving to compensate for possible differences in the pressure exerted on said pistons.

15. A device as claimed in claim 12 wherein the piston of the second piston-cylinder assembly is biased by spring means which resists the action of said pressure for the service braking of the trailer.

16. A device as claimed in claim 12 wherein the piston of the second piston-cylinder assembly is biased by spring means which act in the same direction with the action of the pressure exerted on said piston by the pressure for the service braking of the trailer.

17. A device as claimed in claim 12 which comprises restriction means fitted in the service braking line for the trailer and at least one air inlet arranged near said restriction means leading to the chamber of the second piston-cylinder assembly which is responsive to the pressure for the service braking of the trailer.

18. A device as claimed in claim 17, wherein the restriction means comprises a diaphragm which is removably fitted in the service braking line of the trailer.

19. A device as claimed in claim 17 wherein the restriction means comprises a means shaped as a Venturi tube, and a nozzle at the throat of said Venturi means connecting said nozzle with the chamber of the second piston-cylinder assembly.

No references cited.

EUGENE G. BOTZ, *Primary Examiner.*

M. S. SALES, *Assistant Examiner.*